US012578859B2

(12) United States Patent
    Avanindra

(10) Patent No.: US 12,578,859 B2
(45) Date of Patent: Mar. 17, 2026

(54) METHODS, DEVICES AND SYSTEMS FOR SERIAL BUS TRANSACTIONS WITH SELECTABLE DATA TRANSACTION SIZES

(71) Applicant: Infineon Technologies LLC, San Jose, CA (US)

(72) Inventor: Avi Avanindra, Santa Clara, CA (US)

(73) Assignee: Infineon Technologies LLC, San Jose, CA (US)

( * ) Notice: Subject to any disclaimer, the term of this patent is extended or adjusted under 35 U.S.C. 154(b) by 0 days.

(21) Appl. No.: 18/678,193

(22) Filed: May 30, 2024

(65) Prior Publication Data

US 2025/0165147 A1      May 22, 2025

Related U.S. Application Data

(60) Provisional application No. 63/602,186, filed on Nov. 22, 2023.

(51) Int. Cl.
    *G06F 3/06* (2006.01)

(52) U.S. Cl.
    CPC ............ *G06F 3/061* (2013.01); *G06F 3/0659* (2013.01); *G06F 3/0673* (2013.01)

(58) Field of Classification Search
    CPC ...... G06F 3/061; G06F 3/0659; G06F 3/0673; G06F 1/00; G06F 7/00; G06F 15/00; G06F 17/00; G06F 11/00
    See application file for complete search history.

(56) References Cited

U.S. PATENT DOCUMENTS

2024/0184875 A1    6/2024  Zitlaw et al.

*Primary Examiner* — Yong J Choe

(57) ABSTRACT

A method can include receiving, at a serial input/output (IO) of a memory device, at least command values, address values and metadata that includes an encoded length value in synchronism with a serial clock. From at least the command, address and encoded length values, a memory access operation, a memory array location, and one of a plurality of different data length values (LEN) corresponding to the memory access operation can be determined. At least data having a length corresponding to the one of the plurality of different LEN can be transferred at the serial IO in synchronism with the serial clock during execution of the memory access operation. Corresponding devices and systems are also disclosed.

20 Claims, 15 Drawing Sheets

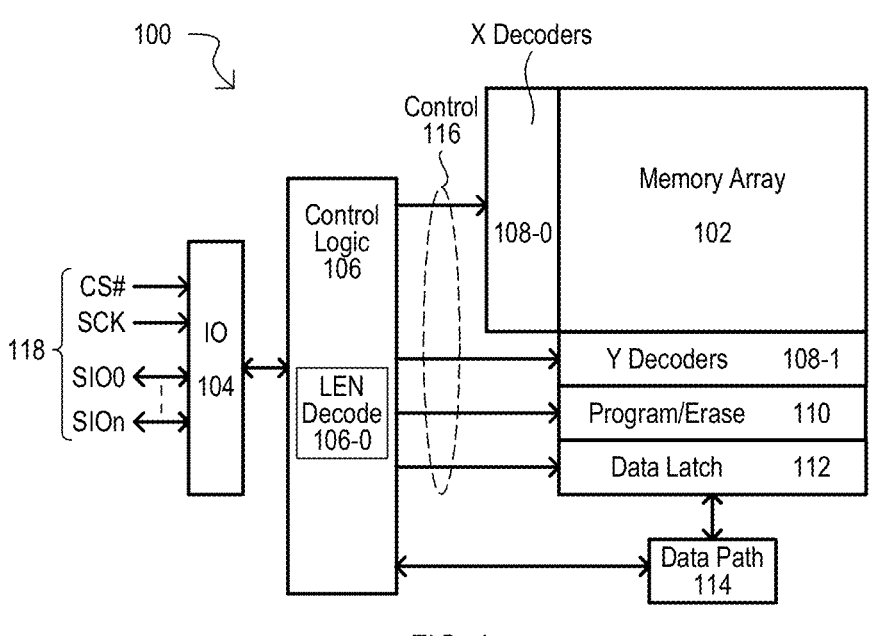
FIG. 1
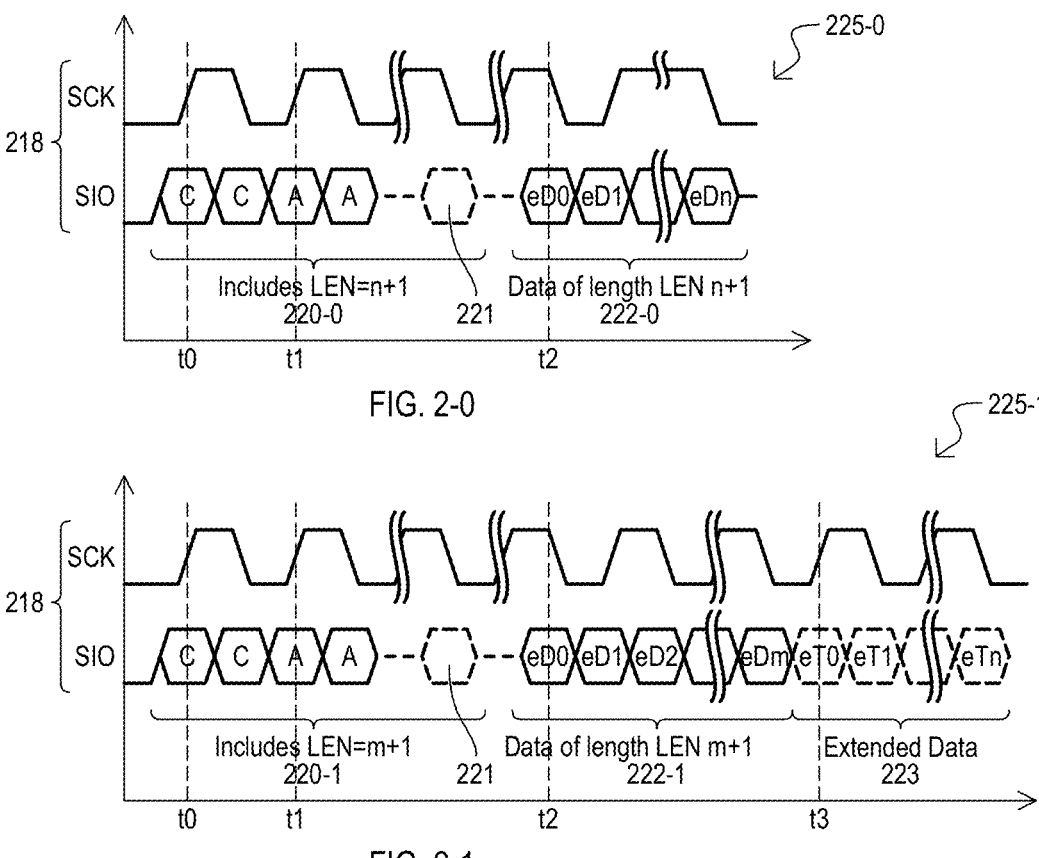
FIG. 2-0
FIG. 2-1

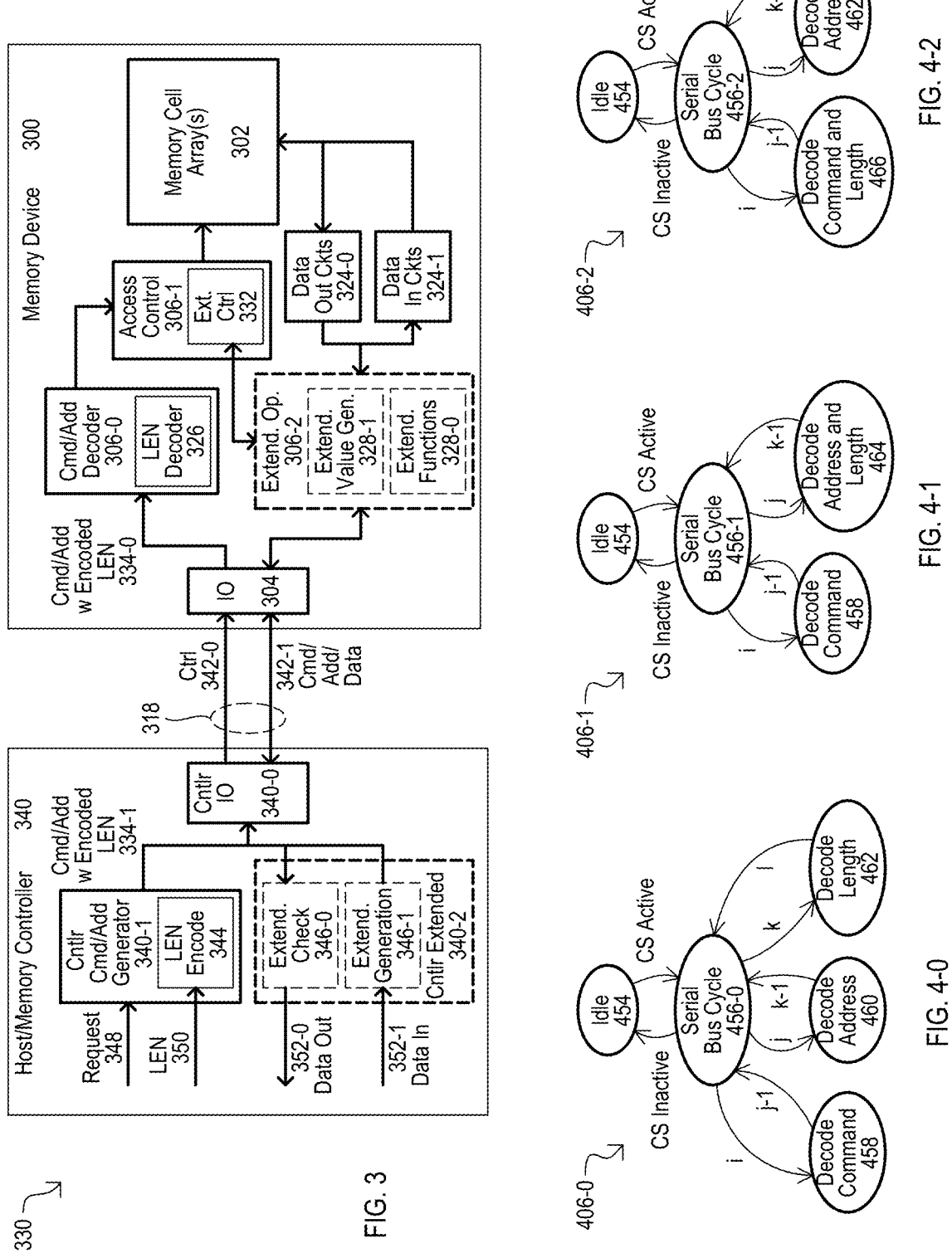

| Opcode | Description |
|---|---|
| XX | Read with extended bytes |
| YY | Program with extended bytes |
| ZZ | Erase with extended bytes |

| | | Description |
|---|---|---|
| {L1,L0} | | = Length (Bytes) |
| 0-4K | | |
| +4K-64K | | Other options, (e.g., Auth. w/o encryption) |

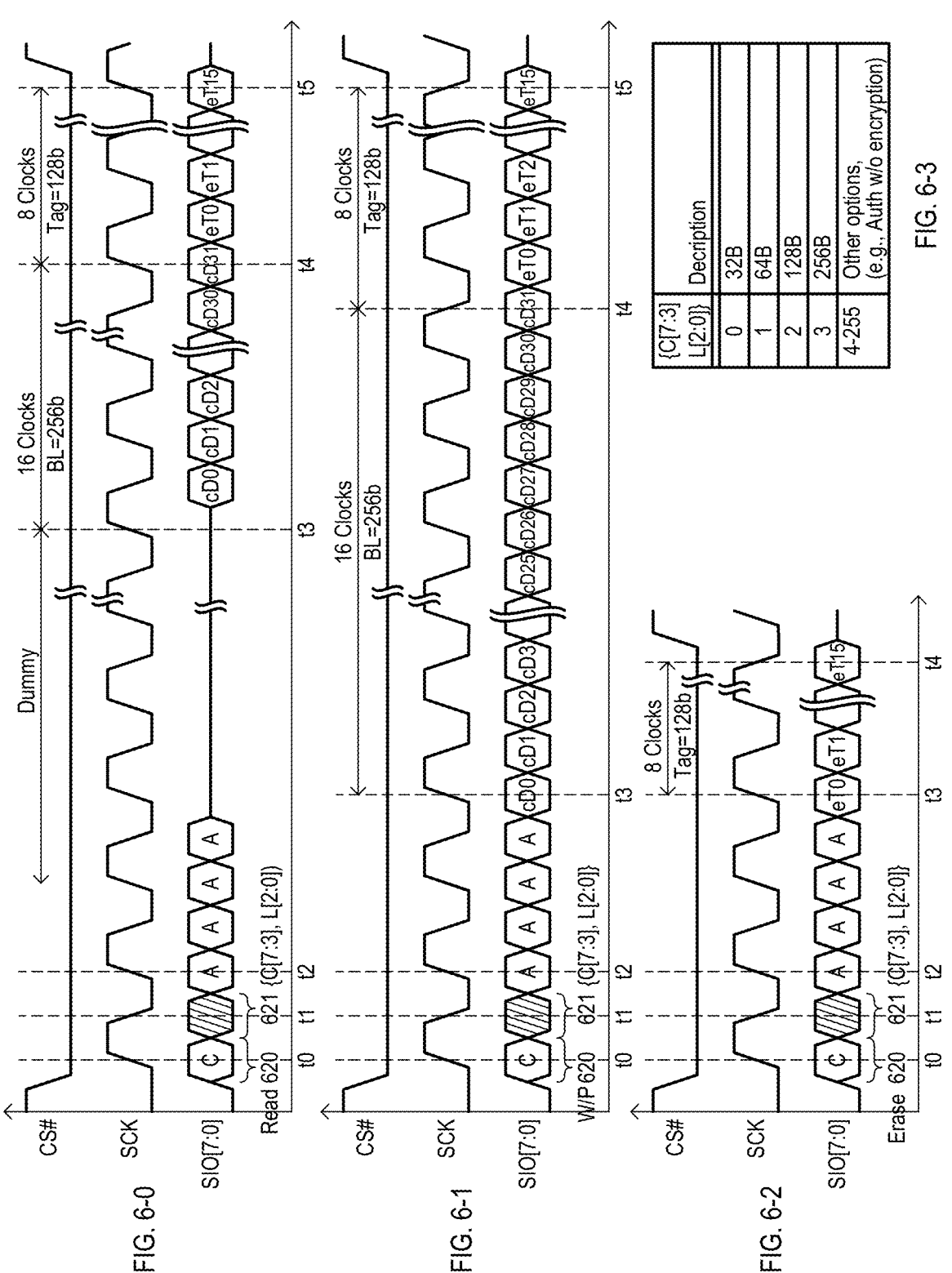

| L[4:0] | Data Size |
|---|---|
| 0 | 32B |
| 1 | 64B |
| 2 | 128B |
| 3 | 256B |
| 4-31 | Other options, (e.g., Auth w/o encryption) |

870

Receive command, address and
encoded data length values
at serial input/output (IO)
in synchromism with serial clock
870-0

Decode received values to determinie
one of many possible
transaction data lengths
870-1

Transfer at least transaction data
having the data length at serial IO
in synchronism with serial clock
870-2

SERIAL INTERFACE

| Command Name | Function | Instruction (Hex) | |
|---|---|---|---|
| ⦂ | ⦂ | ⦂ | |
| READ | Read | 13 | |
| FAST_READ | Read Fast | 0C | |
| LEN_READ | Variable Length Read | XX | } 1572-0 |
| ⦂ | ⦂ | ⦂ | |
| PP | Page Program | 12 | |
| LEN_PP | Variable Length Program | XX | } 1572-1 |
| ⦂ | ⦂ | ⦂ | |
| SE | Sector Erase | 21 | |
| LEN_SE | Advanced Sector Erase | XX | } 1572-2 |
| ⦂ | ⦂ | ⦂ | |

FIG. 15

Address Space
1984

METHODS, DEVICES AND SYSTEMS FOR SERIAL BUS TRANSACTIONS WITH SELECTABLE DATA TRANSACTION SIZES

CROSS-REFERENCE TO RELATED APPLICATIONS

The present application claims the priority and benefit of U.S. Patent Application No. 63/602,186 filed on Nov. 22, 2023, the contents of which are incorporated by reference herein in their entirety.

TECHNICAL FIELD

The present disclosure relates generally to authentication of memory device transactions, and more particularly to enabling memory device transactions with selectable extended data size, where extended data is in addition to read, write, program or erase data.

BACKGROUND

Currently, many electronic platforms employing memory storage devices are concerned with the security of data access operations. A number of specifications, including some automotive specifications, require that code and data stored by a memory device be authenticated prior to execution.

Conventionally, systems can employ a "shadow" memory for improved security. In such an arrangement, code for execution can be transferred from a nonvolatile memory (NVM) to a volatile memory. A host (e.g., device that would execute the code) can authenticate the code that has been transferred to the volatile memory. Shadow memory approaches are not compatible with execution-in-place (XiP) designs, where code is advantageously executed directly from an NVM, as only the code resident on the volatile memory is authenticated.

In conventional serial peripheral interface bus (SPI) transactions, the number of bytes transferred can be determined by host de-assertion of a chip select signal (CS). Alternatively, such transactions, such as read operations, operate on a fixed data length, such as the amount of read data. Some conventional memory devices can include a configuration register by which a "wrap length" can be used to specify a fixed transaction length outside of an SPI protocol.

It would be desirable to have a protocol that specifies the size of the data transfer before the data transfer begins. This could allow efficient implementation of security features such as authentication tag.

SUMMARY

A method can include receiving, at a serial input/output (IO) of a memory device, at least command values, address values and metadata that includes an encoded length value in synchronism with a serial clock. From at least the command, address and encoded length values, a memory access operation, a memory array location, and one of a plurality of different data length values (LEN) corresponding to the memory access operation can be determined. At least data having a length corresponding to the one of the plurality of different LEN can be transferred at the serial IO in synchronism with the serial clock during execution of the memory access operation. Corresponding devices and systems are also disclosed.

BRIEF DESCRIPTION OF DRAWINGS

FIG. 1 is a block diagram of a memory device according to an embodiment.

FIGS. 2-0 and 2-1 are timing diagrams showing memory device transactions according to embodiments.

FIG. 3 is a block diagram of a system according to an embodiment.

FIGS. 4-0, 4-1 and 4-2 are state diagrams showing decoder device and operations according to embodiments.

FIGS. 5-0, 5-1 and 5-2 are diagrams showing memory device transactions according to embodiments. FIG. 5-3 is a table showing memory device commands according to an embodiment. FIG. 5-4 is a table showing encoded data length (LEN) values according to an embodiment.

FIGS. 6-0, 6-1 and 6-2 are diagrams showing memory device transactions according to additional embodiments. FIG. 6-3 is a table showing address and encoded LEN values according to an embodiment.

FIGS. 7-0, 7-1 and 7-2 are diagrams showing memory device transactions according to further embodiments. FIG. 7-3 is a table showing encoded LEN values according to another embodiment.

FIG. 15 is a table showing commands that can be received at a memory device serial interface according to an embodiment.

FIGS. 16-0 and 16-1 are diagrams of memory arrays that can be included in embodiments.

FIGS. 18-0 and 18-1 are diagrams showing memory controllers according to embodiments.

DETAILED DESCRIPTION

According to embodiments, a memory device can receive an encoded data length (LEN) value with command and address values received in a transaction. An encoded LEN value can indicate one of many possible lengths for data included in the transaction. In a read operation, an LEN value can indicate the size of corresponding read data. In a write or program operation, an LEN value can indicate the size of corresponding write or program data. In this way, the amount of data transferred in a memory device transaction can be controlled by bit values transferred with command and address values. A LEN value can correspond to a number of serial clock cycles needed to transfer the data, and so can vary according to serial bus size.

In some embodiments, a memory device transaction can include additional data extending beyond the LEN value, such as "tag" data for authenticating a transaction.

In some embodiments, in addition to data length, and LEN value can include metadata for the transaction. Such metadata can include, but is not limited to, indicating encryption of data or the inclusion of authentication data.

According to embodiments, in a read transaction, a memory device can provide any of numerous possible read data sizes determined by a LEN value received with command and address data. Similarly, in a write or program operation, a memory device can determine amount of data being received according to a LEN value received with command and address data.

In some embodiments, encoded LEN values can be received after command values and address values.

In some embodiments, LEN values can be received with command values, and be followed by address values.

In some embodiments, LEN values can be received with address values following command values.

In some embodiments, LEN values can include additional metadata that can indicate features of the corresponding transaction.

In some embodiments, transactions with selectable data length values can occur between a nonvolatile memory device and a host device. A host device can read and execute code directly from the nonvolatile memory device (i.e., execute in place (XiP) operations) with a command-address (CMD/ADD) sequences that include encoded LEN values.

Figures 0, 1, 2, 3, 4, 5:
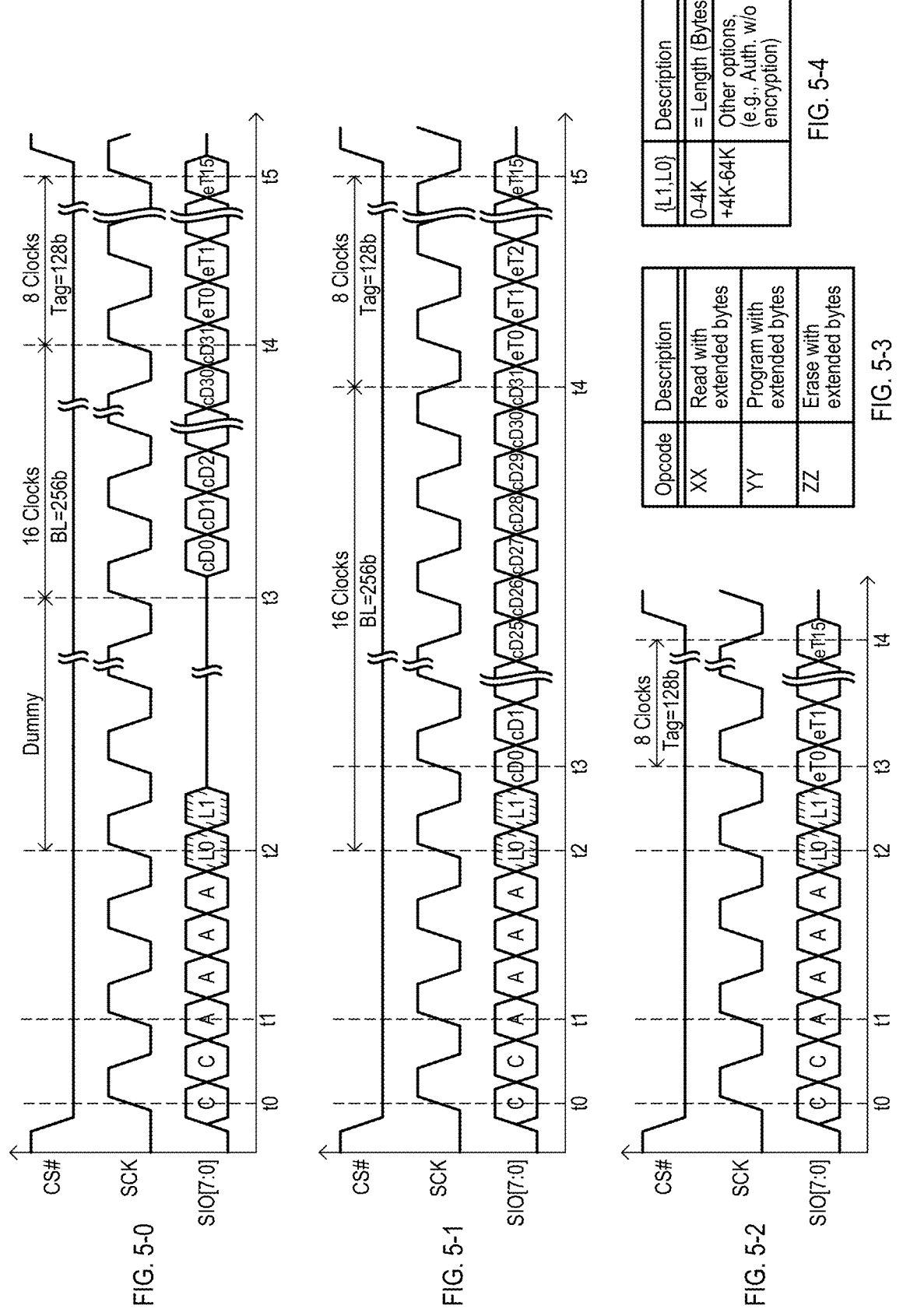

FIG. 1 is a block diagram of a memory device 100 according to an embodiment. A memory device 100 can include a memory array 102, input/output (IO) circuits 104, control logic 106, array decoder circuits 108-0/1, program and erase circuits 110, a data latch 112 and a data path 114. A memory array 102 can include memory cells of any suitable type, including nonvolatile memory cells, volatile memory cells and combinations thereof. IO circuits 104 can be connected to a serial bus 118, which can carry a control signal CS #, a serial clock SCK, and one or more serial input and/or output SIO0 to SIOn. It is understood that a sequence of command and address values can be received as serial data on one serial IO (e.g., SIO0) in synchronism with SCK. In addition an encoded LEN value can be received as part of a command address sequence.

Control logic 106 can receive command values, address values and LEN values received at IO circuits 104. In response to such values, control logic 106 can generate control signals 116 that can control accesses to memory array 102. Unlike a conventional memory device, control logic 106 can include a LEN decode circuits 106-0 that can generate a LEN value to determine a size (e.g., length) of the data that is the subject of a memory access transaction. It is understood that LEN decode circuits 106-0 can determine one of a number of possible different LEN values from a received command/address (CMD/ADD) sequence. This is contrast to conventional devices that may require the programming of a configuration register to establish a data length size for a transaction beyond a default or initially configured size.

Array decoders can include X-decoders 108-0 and Y-decoders 108-1. X-decoders 108-0 can select rows of memory cells, and in some embodiments a higher organization of memory cells (e.g., blocks). Y-decoders 108-1 can select columns of memory cells. In some embodiments, data can be stored with corresponding extended data within memory array 102. As a result, in response to a decoded LEN value, decoder circuits (108-0 and/or 108-1) can access the appropriate amount of memory locations at an address provided in an CMD/ADD sequence. Further as noted herein, an LEN value can include metadata related to an operation.

In the embodiment shown, a memory device 100 can include program and erase circuits 110 for programming and erasing data from nonvolatile memory cells within memory array 102. In some embodiments, such programming of data can vary according to an LEN value. In some embodiments, metadata in an LEN value can control features of an erase operation as well. In some embodiments, control logic 106 can process authenticated transactions. In such cases, additional data (referred to herein as "tag" data) can be received following the transmission of data having a length indicated by an LEN value. Tag data can authenticate the data for the transaction and/or the transaction itself (e.g., authenticate the command/address data). While FIG. 1 shows program and erase circuits 110 compatible with nonvolatile memory cells, alternate embodiments can include volatile memory cells, in which case program/erase circuit 110 can be (or include) a write circuit suitable for the memory cell type (e.g., write amplifiers, refresh circuits, etc.).

A data latch 112 circuit can latch data for programming/writing into memory array 102. A data path 114 can transfer data between control logic 108 and data latch 112 and/or memory array 102.

In this way, a memory device can decode a value received in command address sequence on a serial input to determine a variable data length size. Operations to transmit and/or receive data can be adjusted to meet the data length size.

FIGS. 2-0 and 2-1 are a timing diagram showing memory device transactions 225-0 and 225-1 according to embodiments. Memory device transactions 225-0/1 can occur over a serial bus 218. FIGS. 2-0 and 2-1 shows a serial clock signal SCK as well as waveform for a serial IO (SIO). SIO can be a single IO, or a combination of SIOs including multiple other IOs for receiving/transmitting data for a transaction (e.g., Quad SPI (QSPI), Octal SPI (OSPI)). Still further, in some embodiments, SIOs can be separated into one or more serial inputs dedicated for receiving serial data, and one or more serial outputs dedicated to transmitting serial data.

FIG. 2-0 shows a transaction in which a CMD/ADD sequence includes one LEN value. FIG. 2-1 shows another transaction in which a CMD/ADD sequence includes another, different LEN value.

Referring to FIG. 2-0, at time t0 a device can start to receive a command/address sequence 220-0. A CMD/ADD sequence 220 can include command data (C), address data (A), and unlike conventional transactions, data indicating an LEN value of n+1. In some embodiments, such a value can be an encoded LEN value. LEN data can be included separately from command and address data (shown as 221), included with command data, included with address data, or combinations thereof.

Command data can be received (e.g., latched) on rising and falling edges of SCK. In some embodiments, command data received on rising and falling edges can be the same data (i.e., the command is repeated). However, in other embodiments, command data can be received on a rising edge, while a command data on a falling edge can include LEN data. While FIG. 2-0 shows command data received over a single cycle of SCK, in other embodiments, command data can be received over a larger number of cycles, and such command data may include LEN data.

At time t1, following command data, address data can be received on rising and falling edges of SCK. In some embodiments, address data can include LEN data. In some embodiments, LEN data can occupy the least significant address bits. In some embodiments, LEN (and possibly other data), can be received in extended command data 221 that can follow command and address data.

At time t2, transaction data having a length LEN 220-0 can be transmitted or received according to the transaction 225-0. In the embodiment shown, a LEN value indicates n+1. Consequently, transaction data 220-0 can have a length of n+1. Such data can be transmitted after a CMD/ADD sequence (e.g., a read operation) or received with a CMD/ADD sequence (e.g., a write/program operation).

Referring now to FIG. 2-1, as in the case of FIG. 2-0, at time t0 a device can start to receive a command/address sequence 220-1. However, such a CMD/ADD sequence 220 can include a different LEN value of m+1. As a result, corresponding transaction data 220-1 can have a length of m+1.

FIG. 2-1 also shows extended data 223 that can be included in some transactions. Extended data 223 can be received following transaction data of length m+1. Extended data 223 can represent any suitable data in addition to transaction data, including but not limited to authentication data, error detection data (e.g., CRC) and/or error correction data (ECC codes).

It is noted that, according to embodiments, command and address data for the two transactions 225-0/1 of FIGS. 2-0 and 2-1, could be identical, but the difference in LEN value results in a change in the size of data transmitted for the transaction.

In this way, memory device transactions can include a selectable data length value in a CMD/ADD sequence, and transaction data can be transmitted over a number of clock cycles corresponding to the selected data length.

FIG. 3 is a block diagram of a system 330 according to an embodiment. A system 330 can include a memory device 300 and a memory controller 340 in communication over a serial bus 318. In some embodiments, a memory device 300 can be one implementation of that shown in FIG. 1.

A memory device 300 can include one or more memory cell arrays 302, IO circuits 304, CMD/ADD decoder circuits 306-0, access control circuits 306-1, data output circuits 324-0, data input circuits 324-1, and optionally, extended data operation circuits 306-2. Memory cell array(s) 302 can include one or more memory cell arrays as described herein, or equivalents. IO circuits 304 can be connected to a serial bus 318, and receive control signals 342-0 and receive command, address and LEN values, as well as receive or transmit data values over one or more SIOs.

In the embodiment shown, CMD/ADD decoder circuits 306-0 can receive command and address data, along with encoded LEN data 334-0. From such data, CMD/ADD decoder circuits 306-0 can determine a type of transaction, an address corresponding to the transaction, and an LEN value for the transaction. Such values can be provided to access control circuits 306-1. Access control circuits 306-1 can control access to memory cell array(s) 302 according to a determined transaction type and LEN size. Access control circuits 306-1 can include extended transaction control circuits 332 to account for extended data included in a transaction. For example, extended control circuits 332 can operate on data received after data of length LEN (i.e., after transaction data) which will be understood to be extended data and not transaction data.

Optional extended data operations circuits 306-2 can execute extended data operations indicated by a CMD/ADD sequence. Extended data operations can include any suitable operations that utilize extended data with command, address and/or other data associated with the transaction. In some embodiments, extended operations can include, but are not limited to, authentication, error detection, or error correction. Authentication operations can include any of: authenticated read operations, authenticated write or program operations, and authenticated erase operations. In authenticated read operations, extended data can be used to authenticate read data transmitted with the extended data. In authenticated program or write operations, extended data can be transmitted with a CMD/ADD sequence and used to authenticate the program/write data and/or the CMD/ADD data. In addition or alternatively, authenticated program or write operations can write extended data into a memory device with corresponding write/program data. When the data that was programmed/written is read out as read data, such extended data can be output with the read data. In authenticated erase operations, extended data can be transmitted with a CMD/ADD sequence and used to authenticate the CMD/ADD data. Error detection operations can use extended data to detect errors in data (e.g., write or program data) using extended data received with such data.

In the embodiment shown, extended operations circuits 306-2 can include extended function circuits 328-0 and extended value generation circuits 328-1. Extended function circuits 328-0 can execute extended operations as described herein, including but not limited to, authenticating write/program data using corresponding extended data and/or authenticating a write/program or erase command (and possibly address) using corresponding extended data. While a host can generate extended values, in some embodiments, a memory device 300 can include extended value generation circuits 328-1. In some embodiments such circuits can include generating extended values from read data, such as authentication values, EDC or ECC.

Data out circuits 324-0 can provide a path from memory cell arrays(s) 302 to extended operations circuits 306-2. Data in circuits 324-1 can provide a path from extended operations circuits 306-2 to memory cell array(s) 302.

A memory controller 340 can execute transactions with a memory device 300, and in some embodiments can be part of a host device. A memory controller 340 can include controller IO circuits 340-0, controller CMD/ADD generator circuits 340-1, and optionally, controller extended function circuits 340-2. Controller CMD/ADD generator 340-1 can receive request data 348 and LEN data 350. Request data can indicate a type of operation (read memory, write memory, erase memory). LEN data can indicate a LEN value for a transaction. In response to such inputs, controller CMD/ADD generator 340-1 can generate CMD/ADD values with encoded LEN values for controller IO circuits 340-0. Unlike conventional controller, CMD/ADD generator circuits 340-1 can include an LEN encoder circuit 344 that can encode LEN values into bit combinations for inclusion in a CMD/ADD sequence. As understood from embodiments herein, different encoded LEN bit combinations can correspond to different LEN sizes.

Optional controller extended functions circuits 340-2 can execute functions related to extended data transactions. Extended check circuits 346-0 can receive data from a memory device 300, and can execute one or more functions associated with received extended data, including but not limited to, authentication of read data with corresponding extended data, error detection and/or correction of read data with corresponding extended data. Authenticated read data can be output from extended check circuits 346-0 as data out 352-0. Read data that cannot be authenticated can be discarded. Read data that has been error corrected can be output from extended check circuits 346-0 as data out 352-0. Read data with errors that have only been detected and not corrected can be discarded, and a read operation can be repeated.

Extended data generation circuits 346-1 can generate extended data values for transmission to a memory device 300. In the embodiment shown, data in 352-1 can be received and extended data generated therefrom (e.g., any of authentication data, EDC, ECC). Received data in 352-1 and corresponding generated extended data can then be provided to controller IO circuits 340-0 for output on serial bus 318. In some embodiments, command and/or address data can also be included in the generation of extended data (e.g., for authentication of the CMD/ADD values).

Controller IO circuits 340-0 can drive signals on control lines 342-0 for controlling transmission on serial bus 318. Such control signals 342-0 can include, but are not limited to, a SCK and CS signal. Controller circuits 340-0 can also transmit CMD/ADD sequences with extended data and receive read data with extended data over a one or more SIO lines 342-1.

In this way, a controller device can encode length sizes for transaction data and include such values in a CMD/ADD sequence to a memory device. A memory device can decode the encoded length value to determine a size of data for the transaction indicated by the CMD/ADD sequence.

FIGS. 4-0, 4-1 and 4-2 are state diagrams of a CMD/ADD decoder of a memory device according to embodiments. FIGS. 4-0 to 4-2 can include like items which are referred to by the same reference character.

FIG. 4-0 shows a CMD/ADD decoder 406-0 that can derive encoded LEN values following the reception of command and address data. Upon activation of a CS signal, CMD/ADD decoder 406-0 can transition from an idle state 454 to a decoding operation that varies according to a serial bus cycle 456-0. From bus cycles "i" to "j−1" values received can be decoded as command values 458. From cycles "j" to "k−1", values received can be decoded as address values 460. From cycles "k" to "l", values received can be decoded as LEN values 462. It is understood that clock cycles "i", "j", "k" and "l" can be portions of cycle (e.g., half-cycles). Further, a value of such clock cycles (i−1) can vary according to device configuration (e.g., number of SIOs, memory device address space, memory device IO size, etc.). In some embodiments, cycles i to j−1 can be dedicated to command data, and cycles j to k−1 can be dedicated to address data according to a standard under which a memory device 300 is operating (e.g., an SPI standard).

FIG. 4-1 a CMD/ADD decoder 406-1 that can derive encoded LEN values included with address values. In some embodiments, such a configuration can arise from LSBs of an address being substituted with LEN bits. FIG. 4-1 differs from FIG. 4-0 in that values received from cycles j to k−1, following reception of command values, can be decoded as address and LEN values. In some embodiments, cycles i to j−1 can be dedicated to address data according to the standards under which a memory device 300 is operating.

FIG. 4-2 a CMD/ADD decoder 406-1 that can derive encoded LEN values included with command values. Such a configuration can utilize time periods (e.g., falling clock edges) and/or unassigned bit value combinations in a command value space as encoded LEN values. FIG. 4-2 differs from FIG. 4-0 in that values received from cycles i to j−1 can be decoded as command and LEN values. In some embodiments, cycles i to j−1 can be dedicated to command data according to the standards under which a memory device 300 is operating.

It is noted that embodiments can include combinations of the LEN decoding presented in FIGS. 4-0 to 4-1.

In this way, a CMD/ADD decoder of memory device can decode bits indicating a transaction data length size that are included in any of: bits following clock periods assigned to command and address values, bits included in clock periods assigned to address values, and/or bits included in clock periods assigned to command values.

FIGS. 5-0 to 5-2, 6-0 to 6-2, and 7-0 to 7-2 are timing diagrams showing memory device transactions according to embodiments. Each timing diagram includes a CS #waveform, a SCK waveform, and a SIO waveform. SIO waveform can include eight SIOs [7:0] (e.g., OSPI).

FIGS. 5-0 to 5-2 show data transaction in which LEN and/or metadata can be included at the end of a CMD/ADD sequence as data in addition to command and address values.

Referring to FIG. 5-0, a data read operation according to an embodiment is shown in a timing diagram. Prior to time t0, CS #can transition active (i.e., go low). At time t0, command data (C) can be latched on at least a rising edge of SCK. In the embodiment shown, command data (C) can indicate an extended read operation. An extended read operation can return read data at an indicated address, as well as corresponding extended data to a requesting device. Unlike a conventional read operation, an amount of read data (i.e., LEN) can be determined by an encoded LEN value included in the CMD/ADD sequence within L1, L0. Following command data (C), at time t1, address data (A) can be latched on at last rising edges of SCK. Unlike a conventional serial memory read operation, following address data (A), at time t2 encoded LEN data extended data (shown as L0, I1) can be latched on at least rising edges of SCK. In some embodiments, a second set of command data (C) (i.e., on the falling edge of SCK in FIG. 5-0), can indicate the presence of LEN data (L1, L0) following address data (A).

Referring still to FIG. 5-0, at about time t3, following a number of dummy cycles, read data corresponding to the extended data read operation (shown as cD0 to cD31) can be output in synchronism with rising and falling edges of SCK (i.e., at a double data rate). In the embodiment shown, read data can have a length indicated by encoded LEN values, which in the embodiment shown, can be 32 bytes output over 16 SCK cycles (i.e., and a double data rate).

It is noted that following the transmission of read data at time t4, CS #can remain active. However, because LEN is known by the controller device issuing the read command, the controller device can distinguish where read data ends and extended data begins.

At about time t4, following read data (cD0 to cD31), extended data (shown as eT0 to eT15) can be output on rising and falling edges of SCK. In the embodiment shown, extended data can be a burst length of 128 bits output over 8 SCK cycles. At about time t5, a CS #can be drive inactive, ending the extended data read transaction.

FIG. 5-1 shows an extended data write/program operation according to an embodiment. From time t0 to t2, an extended data write/program operation can follow actions described for FIG. 5-0, but with command values (C) indicating an extended data write/program operation. At about time t3, following encoded LEN data (L0, L1), write/program data corresponding to the extended data write/program operation can be output on rising and falling edges of SCK. Unlike a conventional write/program operation, an amount of write data can be determined by an encoded LEN value included in the CMD/ADD sequence within L1, L0. In the embodiment shown, write/program data can be a burst length of 256 bits output over 16 SCK cycles. At about time t4, following write/program data (cD0 to cD31), extended data (shown as eT0 to eT15) can be output on rising and falling edges of SCK. In the embodiment shown, extended data can be a burst length of 128 bits output over 8 SCK cycles. At about time t5, a CS #can ending the extended data write/program transaction. Due to the LEN value received with L1, L0, a memory device receiving the data can determine where write/program ends, and extended data begins.

FIG. 5-2 shows an extended data erase operation according to an embodiment. From time t0 to t2, an extended data erase operation can follow actions described for FIG. 5-0, but with command values (C) indicating an extended data erase operation. At about time t3, following encoded LEN data (L0, L1), extended data (eT0 to eT15) can be output on rising and falling edges of SCK. In the embodiment shown, extended data can be a burst length of 128 bits output over 8 SCK cycles. At about time t4, a CS #can ending the extended data erase transaction. In some embodiments, LEN data can include metadata related to the erase operation.

FIG. 5-3 is a table showing command values according to an embodiment. In some embodiments, command values can be hexadecimal values, and thus can be transmitted on a rising and falling edge of SCK as shown in FIGS. 5-0 to 5-2. In some embodiments, such command values can be latched a first falling edge of SCK.

FIG. 5-4 is a table showing encoded LEN values (L1, L0) according to an embodiment. In the embodiment shown, encoded LEN values can be 16-bits, where bits [0:12] can indicate a length of transaction data in bytes. Bits [13:15] can provide any other suitable data, including but not limited to other data related to a corresponding extended data operation (e.g., indicating authentication without encryption).

It is understood that alternate embodiments can include operations without extended data, that can provide transaction data (e.g., read data, write/program data) having a length indicated by L0, L1.

In this way, a memory device can decode length data received after command and address values on a serial bus to determine an transaction data length value. For extended data transactions, a memory device can determine where transaction data ends and extended data begins. Decoded length data can also indicate additional information for an indicated operation (e.g., metadata).

FIGS. 6-0 to 6-2 show extended data transaction in which LEN and other data can be included with command values in a CMD/ADD sequence. FIG. 6-0 shows an extended data read operation according to an embodiment. Prior to time t0, CS #can transition active (i.e., go low). At time t0, command data (C) 620 can be latched on a rising edge of SCK. Unlike some conventional serial read operations, rather than repeat command data (C) on a falling edge, encoded LEN data 621 can be latched on a falling edge of SCK. In some embodiments, command data (C) 620 and/or encoded data 621 can indicate an extended read operation. In the embodiment shown, encoded LEN data 621 can include data on all eight SIO lines, with three LSBs L[2:0] indicating an LEN value, and the remaining bits C[7:3] indicating additional features of the extended data operation. Following extended data 621, at time t2, address data (A) can be latched on at least rising edges of SCK. At about time t3, following a number of dummy cycles, the extended data read operation can follow that shown in FIG. 5-0.

FIG. 6-1 shows an extended data write/program operation according to an embodiment. From time t0 to t2, an extended data write/program operation can follow actions described for FIG. 6-0, but with command values (C) 620 and/or encoded values 621 indicating an extended data write/program operation. At about time t3, the extended data write/program operation can follow that shown in FIG. 5-1.

FIG. 6-2 shows an extended data erase operation according to an embodiment. From time t0 to t2, an extended data erase operation can follow actions described for FIG. 6-0, but with command values (C) 620 and/or encoded values 621 indicating an extended data erase operation. At about time t3, the extended data write/program operation can follow that shown in FIG. 5-2.

FIG. 6-3 is a table showing encoded LEN values received with command data according to an embodiment. In the embodiment shown, an encoded LEN value can be 8-bits, where bits [2:0] can indicate a length of extended data in bytes. Bits [7:3] can provide other data related to a corresponding transaction (e.g., authentication without encryption).

In this way, a memory device can decode length data received on a serial bus with command values and before address values. From a data length value, a memory device can determine a size of transaction data. Decoded extended length data can also indicate additional information for an extended operation that utilizes the extended data.

Figures 0, 1, 2, 3, 7:
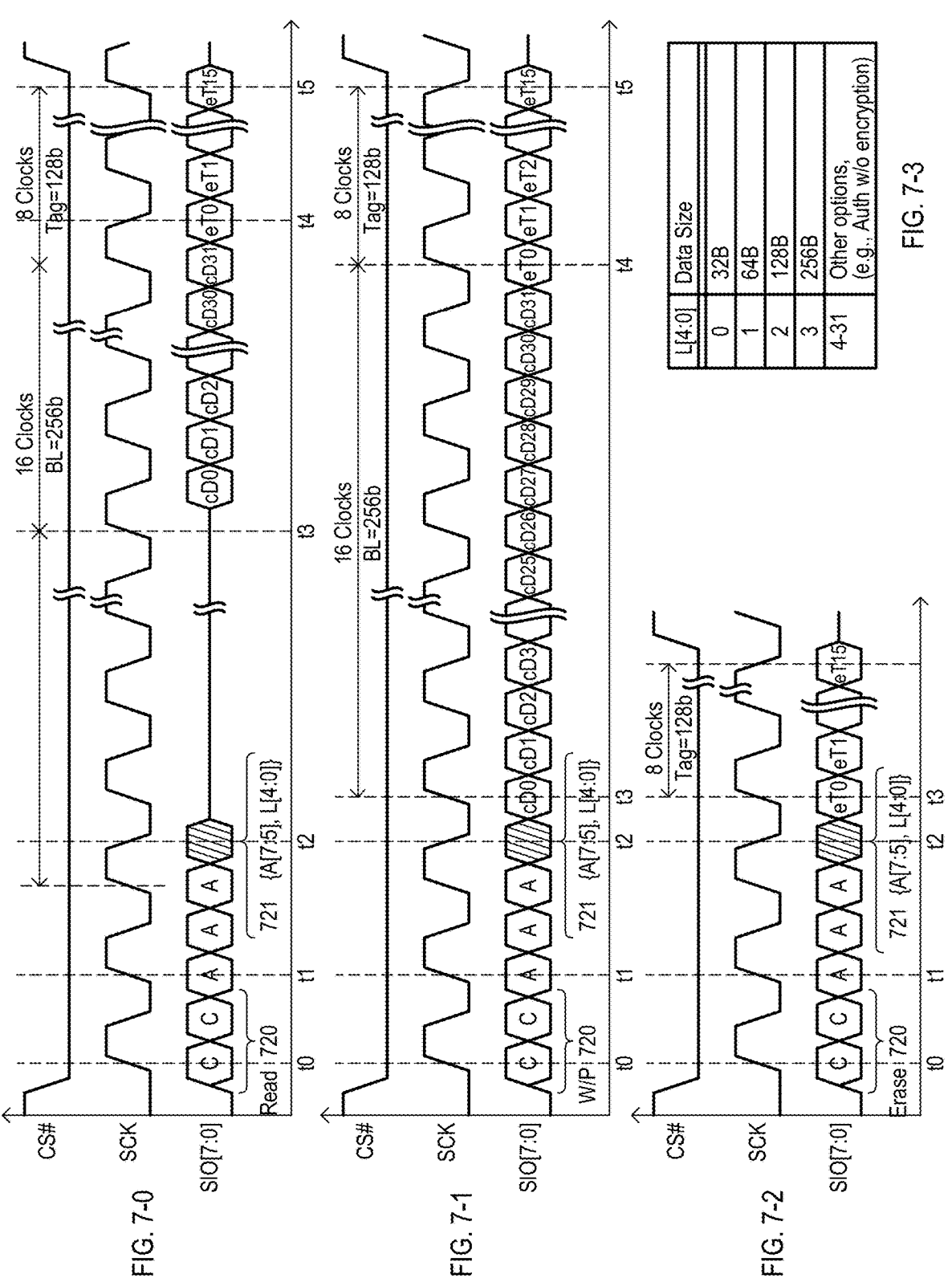

FIGS. 7-0 to 7-2 show extended data transaction in which LEN and other data can be included with address values in a CMD/ADD sequence. FIG. 7-0 shows an extended data read operation according to an embodiment. Prior to time t0, CS #can transition active. At time t0, command data (C) 720 can be latched on at least a rising edge of SCK. Following command data (C), at time t1, address data (A) can be latched on edges of SCK. Unlike some conventional serial read operations, rather than consider data received after command data as being only address data, at time t2, a mix of address values and encoded LEN data 721 can be latched. In some embodiments, command data (C) can indicate an extended data read operation. In the embodiment shown, data latched at time t2 can include three MSBs A[7:5] of address data, with a remaining five LSBs L[4:0] being encoded LEN data. In some embodiments, in addition to transaction data length LEN, LSBs L[4:0] can indicate additional features of the extended data operation. In some embodiments, the number of bits dedicated to encoded LEN data can be based on a data size of the transaction and granularity of address values. For example, if memory device accesses for an application are aligned along 32 byte boundaries, and a smallest data size is one byte, the 5 LSBs of an address may not be needed, and can be dedicated for encoding LEN data. At about time t3, following a number of dummy cycles, the extended data read operation can follow that described for FIG. 5-0.

FIG. 7-1 shows an extended data write/program operation according to an embodiment. From time t0 to t2, an extended data write/program operation can follow actions described for FIG. 7-0, but with command values (C) indicating an extended data write/program operation. At about time t3, the extended data write/program operation can follow that described for FIG. 5-1.

FIG. 7-2 shows an extended data erase operation according to an embodiment. From time t0 to t2, an extended data write/program operation can follow actions described for FIG. 7-0, but with command values (C) indicating an extended data erase operation. At about time t3, the extended data write/program operation can follow that described for FIG. 5-2.

FIG. 7-3 is a table showing encoded LEN values according to an embodiment. In the embodiment shown, an encoded LEN value can be 4-bits, where bits [1:0] can indicate a length of transaction data in bytes. Bits [5:2] can provide other data related to a corresponding operation (e.g., authentication without encryption).

In this way, a memory device can decode a data length value included with address data to determine a transaction data length. From a data length value, a memory device determine the number of clock cycles during which transaction data are transmitted or received. In extended data operations, LEN can also indicate a demarcation between transaction data and extended data.

While the systems and devices described herein show various methods, additional methods will now be described with reference to flow diagrams. Such methods can be executed by circuits of devices and/or systems described herein.

Figure 8:
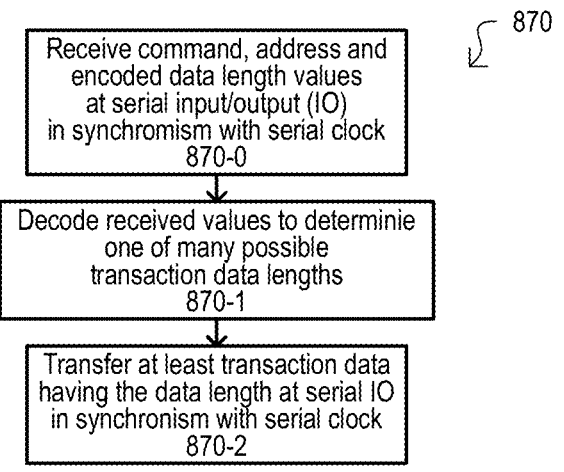
FIG. 8 is a flow diagram of a method according to an embodiment.

FIG. 8 is a flow diagram of a method 870 according to an embodiment. A method can be executed by a memory device. A method 870 can include receiving command, address and encoded data length values at a serial IO in synchronism with serial clock 870-0. Such an action can include receiving a CMD/ADD sequence according to any of the embodiments described herein, or equivalents.

Received values can be decoded to determine one of many possible data length values 870-1. Such an action can include decoding to determine a LEN value according to any of the embodiments described herein, or equivalents. In some embodiments, such an action can also determine information in addition to the LEN value that indicates other features of the extended data operation (e.g., metadata).

At least transaction data values having a length LEN can be transferred at a serial IO in synchronism with a serial clock 870-2. Such an action can include transmitting transaction data from a memory device or receiving transactions data at a memory device. In some embodiments, extended data beyond length LEN can transmitted with the transaction data.

In this way, one of many transaction data length values can be encoded and included in a command address sequence, and transaction data of the indicated length can be included in the memory transaction.

Figure 9:
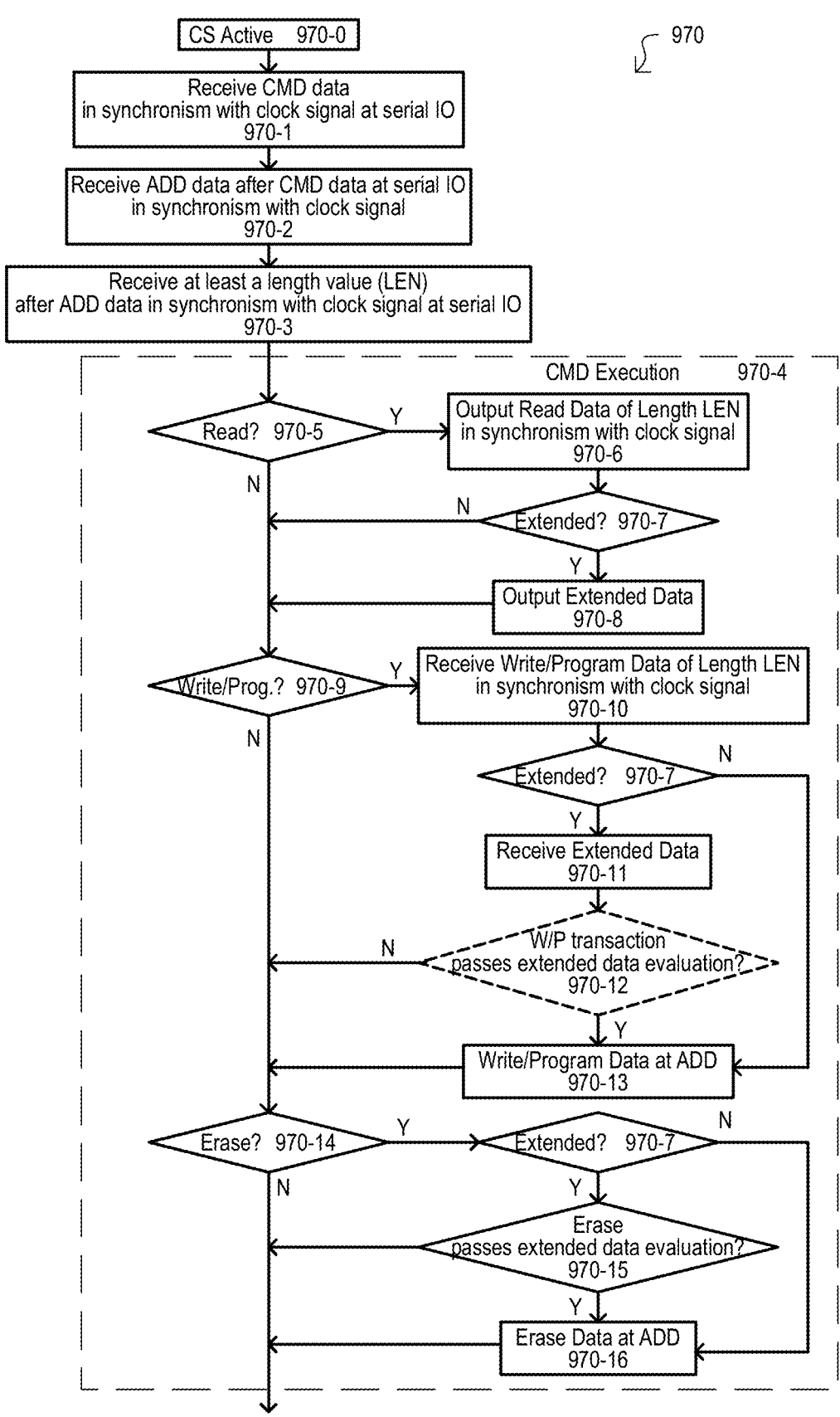
FIG. 9 is a flow diagram showing operations of a memory device according to an embodiment.

FIG. 9 is a flow diagram of another method 970 according to an embodiment. A method 970 can be executed by a memory device to perform any of read, write/program or erase operations, including versions of such operations that include extended data. In response to a CS signal going active 970-0, command data can be received in synchronism with a clock signal at a serial IO 970-1. Such an action can include receiving command data one or more serial IO lines. Address data can be received after command data in synchronism with the clock signal at a serial IO 970-2. A LEN value, and possibly other data, can be received after address data in synchronism with a clock signal at a serial IO 970-3. In some embodiments, a LEN value can be encoded as described herein or an equivalent. Actions 970-0 to 970-3 can make up a received CMD/ADD sequence. A LEN value can include data in addition to a transaction data length value, as described herein or an equivalent. In some embodiments, part of CMD data and/or ADD data can indicate the addition of LEN data following address data.

Referring still to FIG. 9, following the receipt of CMD/ADD and LEN data (970-0, -1, -2) commands can be executed 970-4. CMD data can be decoded. If CMD data indicates a read transaction (Y from 970-5), data of length LEN stored at an address indicated by ADD can be output as read data in synchronism with clock signal 970-6. If a read operation is an extended data read operation (Y from 970-7), extended data corresponding to the read data can be output in synchronism with a clock signal 970-8. In some embodiments, extended data can follow (e.g., be appended to) read data.

If CMD data indicates a write or program transaction (Y from 970-9), write or program data and extended data of length LEN can be received in synchronism with a clock signal 970-10. If a write or program transaction includes extended data (Y from 970-7), extended data can be output with the write or program data 970-11.

Optionally, a write or program transaction can be evaluated with extended data 970-12. Such an action can include any extended evaluation described herein, or equivalents, including but not limited to authenticating received write or program data with extended data, authenticating a received write or program command with extended data, executing error detection and/or correction on write or program data, or possibly corresponding command and address data. If a write or program transaction does not pass an extended evaluation (N from 970-12), received data may not be written or programmed at the address indicated by ADD. If a write or program transaction does pass an extended evaluation (Y from 970-12) or the write or program transaction does not include extended data, received data may be written or programmed at the address indicated by ADD 970-13.

If CMD data indicates an erase transaction (Y from 970-14), and the erase transaction includes extended data (Y from 970-7), an erase transaction can be evaluated with extended data 970-15. Such an action can include, but is not limited to, performing authentication, error detection or error correction on erase transaction command and/or address data. If an erase transaction does not pass an extended evaluation (N from 970-14), data at an address indicated by ADD may not be erased. If an erase transaction does pass an extended evaluation (Y from 970-14) or the erase transaction does not include extended data (N from 970-7), data at an address indicated by ADD may be erased 970-15.

In this way, a method can include receiving LEN data after CMD and ADD data, and executing read or write or program operations with data of length LEN.

Figure 10:
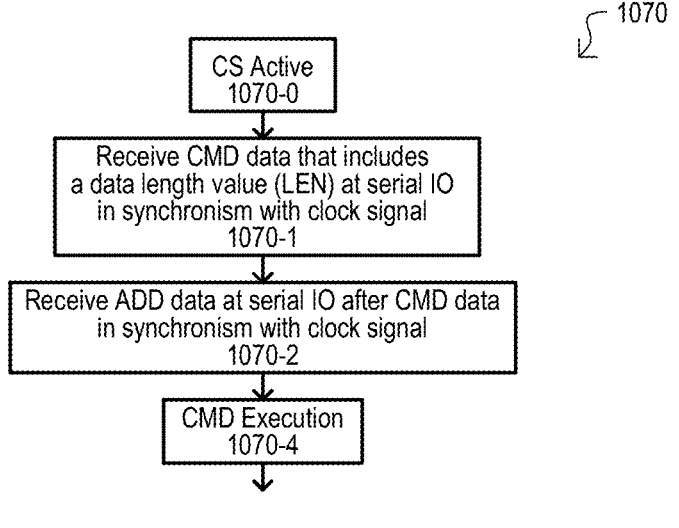
FIG. 10 is a flow diagram showing operations of a memory device according to another embodiment.

FIG. 10 is a flow diagram of another method 1070 according to another embodiment. A method 1070 can be executed by a memory device to perform any of read, write/program or erase operations. In response to a CS signal going active 1070-0, CMD data that includes an LEN value can be received in synchronism with a clock signal at a serial IO 1070-1. In some embodiments, such an action can include receiving CMD on one edge of a serial clock (e.g., rising or falling), and receiving LEN data on an opposing edge of a same clock (e.g., falling or rising). In some embodiments, a LEN value can be encoded and include additional data regarding an extended operation as described herein or an equivalent. ADD data can be received after command data in synchronism with the clock signal at a serial IO 1070-2. Actions 1070-0 to 1070-2 can be a CMD/ADD sequence. Following the receipt of CMD/LEN/ADD data (1070-0,-1,-2) extended commands can be executed 1070-4. Such actions 1070-4 can occur as described for 970-4 in FIG. 9.

In this way, a method can include receiving LEN data with CMD data, followed by ADD data, and executing read, write or program operations with data of size LEN.

Figure 11:
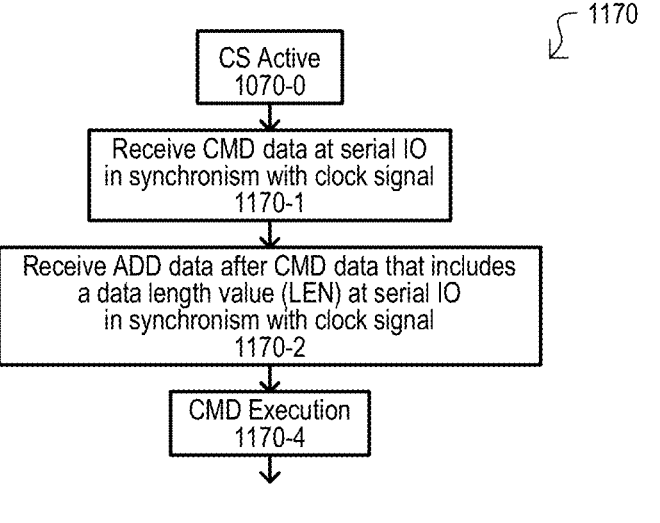
FIG. 11 is a diagram showing operations of a memory device according to a further embodiment.

FIG. 11 is a flow diagram of another method 1170 according to a further embodiment. A method 1170 can be executed by a memory device to perform any of read, write/program or erase operations. In response to a CS signal going active 1170-0, CMD data can be received in synchronism with a clock at a serial IO 1170-1. Such an action can occur as described for 970-1 of FIG. 9, or an equivalent.

Following CMD data, ADD data that includes a LEN value can be received in synchronism with a clock signal at a serial IO 1170-2. In some embodiments, such an action can include receiving ADD data on one edge of a serial clock and receiving LEN data on an opposing edge of a same clock (e.g., falling or rising). In some embodiments, data latched on a clock edge can include both ADD and LEN data. Following the receipt of CMD/ADD/LEN data (1170-0, -1, -2) commands can be executed 1170-4. Such actions 1170-4 can occur as described for 970-4 in FIG. 9.

In this way, a method can include receiving CMD data followed ADD data with LEN data, and executing read, write, or program operations with data of size LEN.

Figure 12:
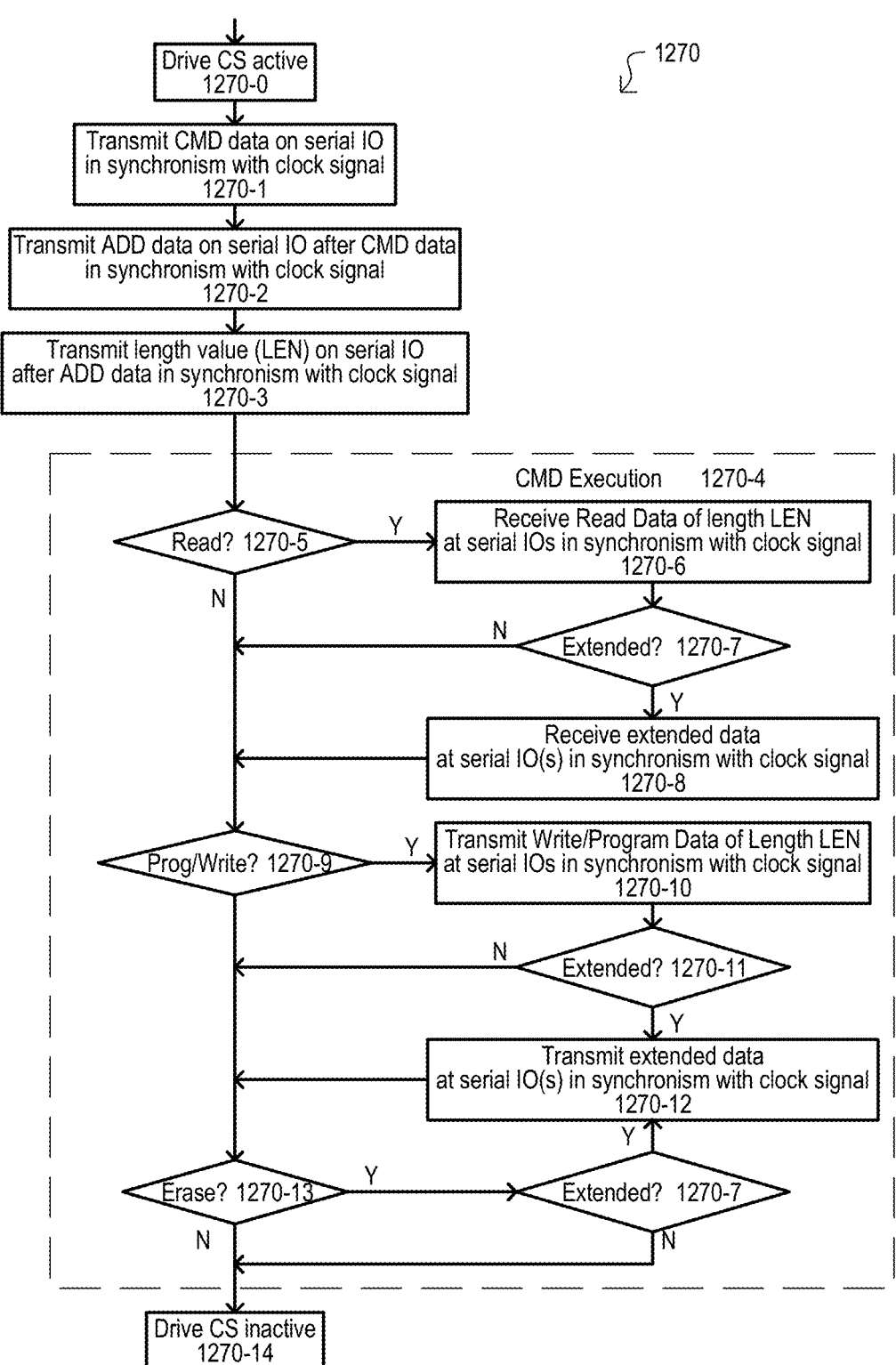
FIG. 12 is a flow diagram showing operations of a memory controller according to an embodiment.

FIG. 12 is a flow diagram of another method 1270 according to an embodiment. A method 1270 can be executed by a memory controller device to perform any of read, write, program or erase operations. A method 1270 can generally follow FIG. 9, but represent a memory controller side.

A method 1270 can include driving a CS signal active 1270-0. CMD data can be transmitted in synchronism with a clock signal on a serial IO 1270-1. ADD data can be transmitted after command data in synchronism with the clock signal on a serial IO 1270-2. A LEN value, and possibly other data, can be transmitted after address data in synchronism with a clock signal at a serial IO 1270-3. A LEN value can be encoded as described herein, or equivalents. Actions 1270-0 to 1270-2 can transmit a CMD/ADD sequence to a memory device. A LEN value can include data in addition to extended data length value, as described herein or an equivalent. In some embodiments, part of CMD data and/or ADD data can indicate the addition of LEN data following address data.

Referring still to FIG. 12, following the receipt of CMD/ADD and LEN data (1270-0, -1, -2) commands can be executed 1270-4. If transmitted CMD data indicates a read operation (Y from 1270-5), read data of length LEN can be received at a serial IO in synchronism with a clock signal 1270-6. In some embodiments, read data can be received after some delay (e.g., dummy cycles or other latency). If a read operation is an extended read operation (Y from 1270-7), extended data of length can be received at a serial IO in synchronism with a clock signal 1270-8. In some embodiments, extended data can follow (e.g., be appended to) read data. If CMD data indicates a write or program transaction (Y from 1270-9), write or program data of length LEN can be transmitted at serial IOs in synchronism with a clock signal 1270-10. If a write or program operation is an extended data operation (Y from 1270-7), extended data can be transmitted at serial IOs in synchronism with a clock signal 1270-12. If an erase operation is an extended operation (Y from 1270-7), extended data can be transmitted at serial IOs in synchronism with a clock signal 1270-12.

After execution of any commands 1270-4, a CS signal can be driven inactive 1270-14.

In this way, a method can include transmitting LEN data after CMD and ADD data, and executing read, write, program or erase operations that include the transmission of transaction data having a length LEN.

Figure 13:
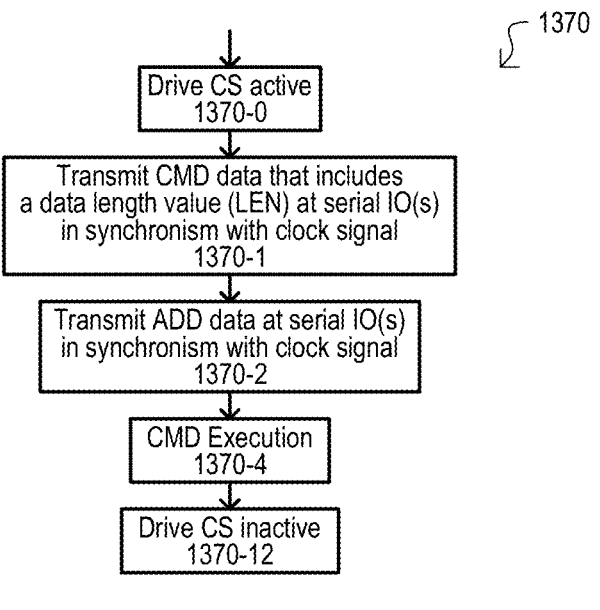
FIG. 13 is a flow diagram showing extended data operations of a memory controller according to another embodiment.
Figure 14:
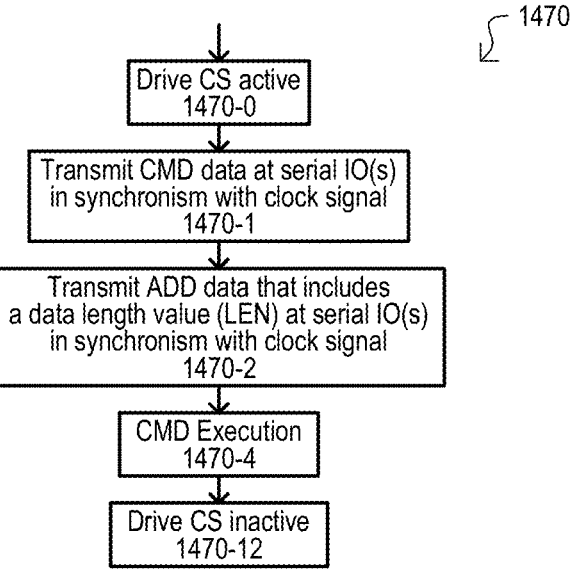
FIG. 14 is a diagram showing operations of a memory controller according to a further embodiment.

FIGS. 13 and 14 are flow diagrams of additional methods 1370 and 1470 according to embodiments. FIG. 13 can include controller actions corresponding to FIG. 10. FIG. 14 can include controller actions corresponding to FIG. 11.

Referring to FIG. 13, a method 1370 can include a CS signal going active 1370-0. CMD data that includes an LEN value can be transmitted in synchronism with a clock signal at a serial IO 1370-1. Such data can take the form of that described for FIG. 10 or an equivalent. ADD data can be transmitted after CMD data in synchronism with the clock signal at a serial IO 1370-2. Actions 1370-0 to 1370-2 can be a CMD/ADD sequence. Following the receipt of CMD/LEN/ADD data (1370-0, -1, -2) extended commands can be executed 1370-4. Such actions 1370-4 can occur as described for 1270-4 in FIG. 12. After any extended data command have been executed 1370-4, a CS signal can be driven inactive 1370-12.

In this way, a method can include transmitting LEN data with CMD data, followed by ADD data, and executing extended data read, write, program or erase operations that include the transmission of extended data of length LEN.

FIG. 14 can include a CS signal going active 1470-0. CMD data can be transmitted in synchronism with a clock at a serial IO 1470-1. Following CMD data, ADD data that includes a LEN value can be transmitted in synchronism with a clock signal at a serial IO 1470-2. Such combination of ADD and LEN values can occur as described for FIG. 11 or an equivalent. Following the transmission of CMD/ADD/LEN data (1470-0, -1, -2) extended commands can be executed 1470-4. Such actions 1470-4 can occur as described for 1270-4 in FIG. 12. After any extended data commands have been executed 1470-4, a CS signal can be driven inactive 1470-12.

In this way, a method can include transmitting CMD data followed by ADD data with LEN data, and executing extended data read, write, program or erase operations that include the transmission of extended data of length LEN.

FIG. 15 is a table showing commands received at a serial interface of a memory device according to an embodiment. Received commands can include standard commands, including but not limited to: a read command (READ), fast read command (FAST_READ), page program command (PP) and a sector erase command (SE). However, unlike a conventional memory device, such standard commands can have corresponding variable length counterparts, in which the amount of transaction can be established by an encoded LEN value included in a CMD/ADD sequence as described herein or equivalents. In the embodiment shown, a Variable Length Read command 1572-0 can establish the amount of read data with an LEN value. A Variable Length Program command 1572-1 can establish the amount of program data with an LEN value. FIG. 15 also shows an Advanced Sector Erase command 1572-2. Such a command can utilize metadata in an LEN value to control aspects of sector erase operation.

In this way, in response to specific received commands, a memory device can execute memory access transactions that can select the amount of data transmitted in a transaction. In addition or alternatively, specific received commands can include metadata. Metadata can include, but is not limited to, data for indicating features of, or controlling features of a transaction.

Figures 0, 16:
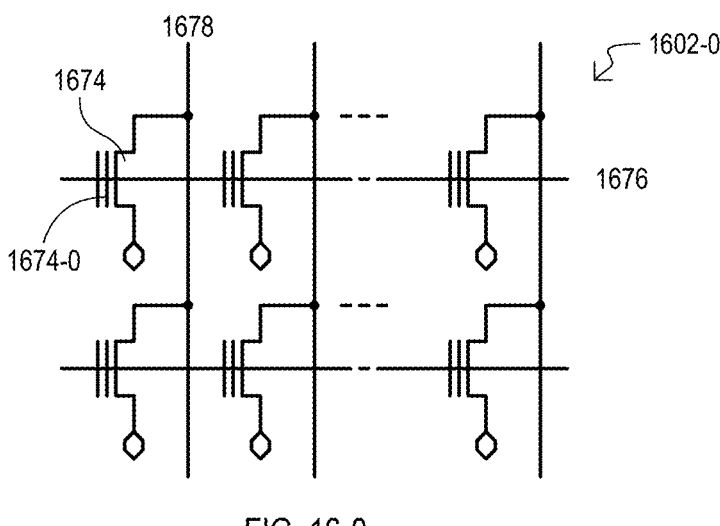
Figures 1, 16:
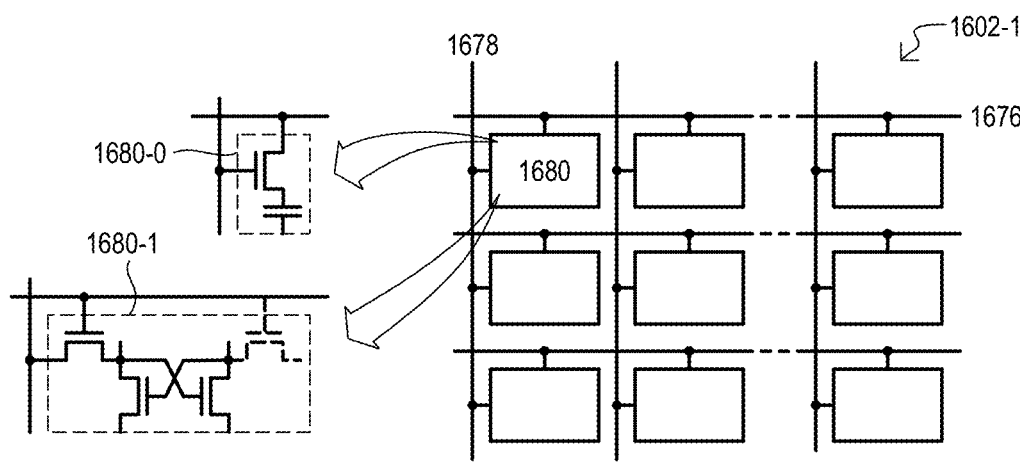

While embodiments can include memory arrays of any suitable type, some embodiments can include 1-transistor (1T) NOR type arrays. FIG. 16-0 is a schematic diagram of a 1T NOR array 1602-0 that can be included in embodiments. Array 1602-0 can include a number of memory cells (one shown as 1674) arranged into rows and columns, with memory cells of a same row being connected to a same word line (one shown as 1676) and memory cells of a same column being connected to a same bit line (one shown as 1678). In some embodiments, memory cells (1674) can be formed with a single transistor structure, having a charge storing structure 1674-0 between a control gate and a channel. A charge storing structure 1674-0 can store one or more bits of data as charge (including absence of charge) without the need for power to maintain the data. A charge storing structure 1674-0 can take any suitable form including but not limited to: a floating gate, a charge storing dielectric (e.g., replacement gate), or a combination thereof. However, embodiments can include any other suitable non-volatile memory cell type.

In some embodiments, commands with embedded LEN values, as described herein and equivalents, can be used to access nonvolatile memory cells, to enable reading of data from a NOR type memory device with selectable data transactions sizes (e.g., lengths), including execute-in-place (XiP) code reading operations.

Embodiments can also include any suitable volatile array structure or volatile memory cell type. FIG. 16-1 is a schematic diagram of possible volatile memory cells arrays that can be included in embodiments. FIG. 16-1 shows an array 1602-1 that can include a number of volatile memory cells (one shown as 1680) arranged into rows and columns and connected to one or more bit lines (e.g., 1678) and word lines (e.g., 1676). Volatile memory cells (1680) can take any suitable form, including but not limited to DRAM cells 1680-0 and/or SRAM cells 1680-1. SRAM cells 1680-1 can include, but are not limited to, 4-transistor (4T), 6T and/or 8T variations.

Figure 17:
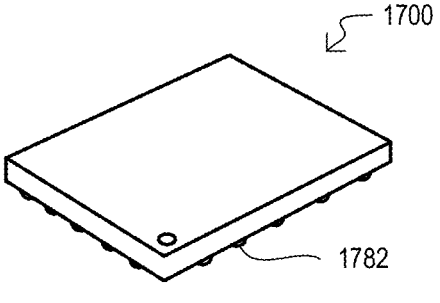
FIG. 17 is a diagram of an integrated circuit (IC) device according to an embodiment.

While embodiments can include devices and systems with various interconnected components, embodiments can also include unitary devices which can execute extended data memory device transactions as described herein and equivalents. In some embodiments, such unitary devices can be advantageously compact single integrated circuits (i.e., chips). FIG. 17 shows a packaged memory IC device 1700 which can execute extended data transaction according to embodiments described herein. CMD/ADD sequences with embedded LEN data can be received and a selected amount of transaction data can be input or output on one or more external connections (one shown as 1782). However, a memory device according to embodiments can include any other suitable integrated circuit packaging type, as well as direct bonding of a device chip onto a circuit board or substrate.

In this way, an IC memory device can execute extended data memory transactions.

Figures 0, 1, 18:
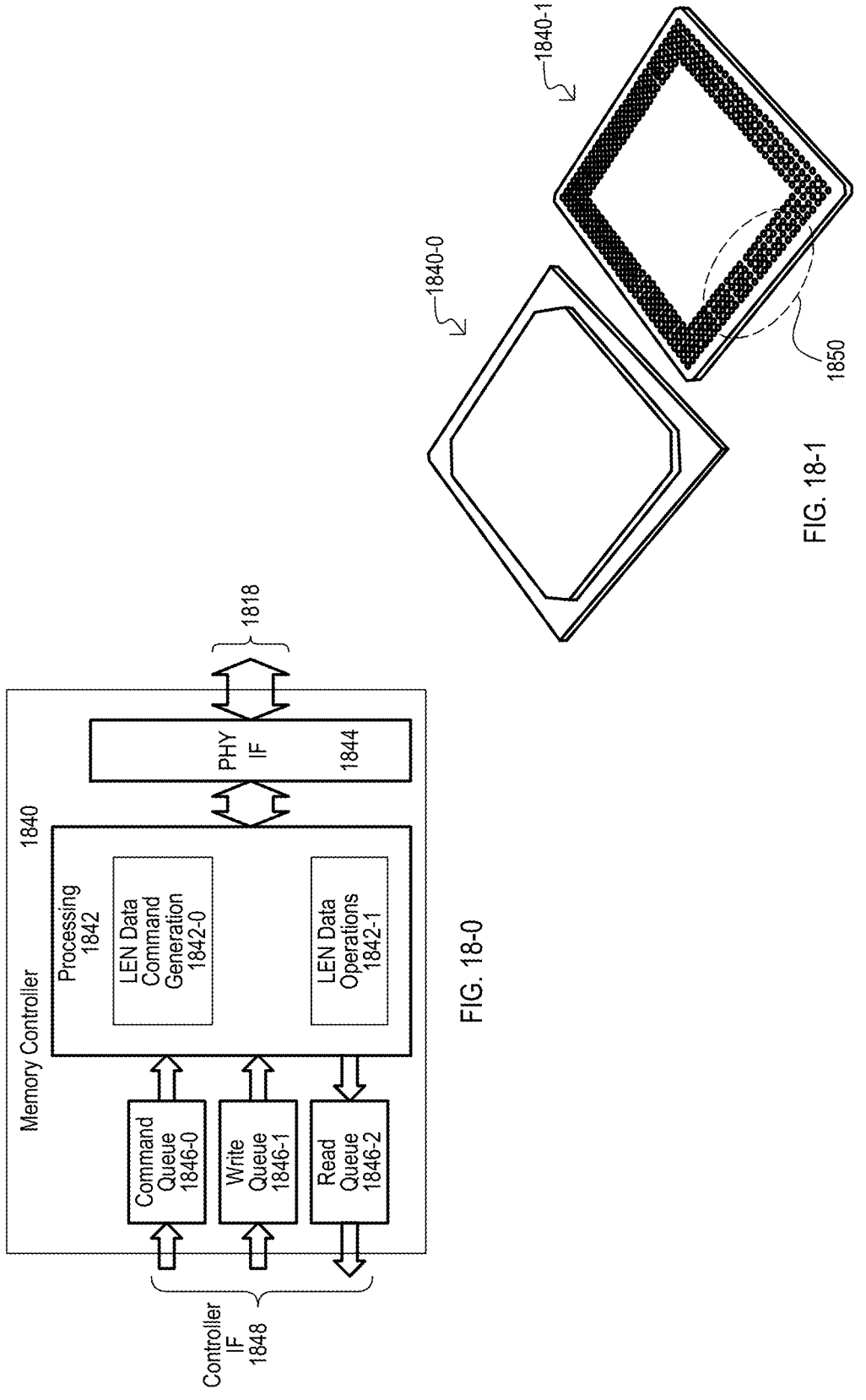

While embodiments can include memory devices that execute memory access transactions with selectable transaction data sizes, embodiments can also include memory controller circuits that can execute such transactions over an interface compatible with a memory device. Such a memory controller can be part of a host device. FIG. 18-0 shows a memory controller 1840 according to an embodiment. A memory controller 1840 can include processing circuits

1842, IF circuits 1844, a command queue 1846-0, a write queue 1846-1, and a read queue 1846-2. Processing circuits 1842 can include LEN command generation circuits 1842-0 and LEN data operation circuits 1842-1.

A command queue 1846-0, a write queue 1846-1 and read queue 1846-2 can be connected to a controller IF 1848, which can be part of a larger host device, or connected to a host device via a communication path. A command queue 1846-0 can receive memory requests over controller IF 1848 to access a memory device connected to a bus 1818. A write data queue 1846-1 can receive write or program data associated with a memory request (e.g., data to be stored in a memory device). A read data queue 1846-2 can provide read data resulting from a memory request (e.g., data read from a memory device).

In some embodiments, LEN data command generation circuit 1842-0 can distinguish between memory access requests received over command queue 1846-0, with some requests resulting in CMD/ADD sequences with encoded LEN data values, and other requests resulting in standard CMD/ADD sequences (i.e., sequences without encoded LEN bits). However, in other embodiments, no such distinction can be made, and all memory access requests can result generate CMD/ADD sequences with encoded LEN values. Transactions can take the form of any of those described herein or equivalents. LEN data operations circuit 1842-1 can execute operations according to any of the embodiments described herein or equivalents, including but not limited to distinguishing between transaction data and extended data according to an LEN value. An interface 1844 and corresponding bus 2818 can be any suitable bus, including but not limited to a bidirectional serial bus.

In this way a memory controller can generate CMD/ADD sequences with transaction data length values for processing by a memory device in response to memory access requests.

While embodiments can include systems with memory devices operating in conjunction with a host device, embodiments can also include standalone host devices having LEN command generation and operations circuits and one or more memory device IFs formed in a single IC package. Such an embodiment is shown in FIG. 18-1. FIG. 18-1 shows a packaged host device in a perspective top view 1840-0 and bottom view 1840-1. Host device 1840-0/1 can include a number of physical connections (e.g., 1850) all or a portion of which can be connected to a memory device IF as described herein. Such IF(s) can execute data transactions for processing, as described herein and equivalents. In some embodiments, a host device can be a System-On-Chip (SoC) type device. It is understood that host devices can include any other suitable package type.

In this way, an IC host device can generate data transactions with selectable transaction data sizes in response to requests received over a controller IF.

Figure 19:
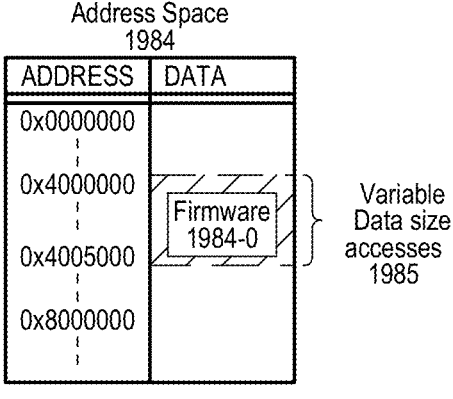
FIG. 19 is a diagram showing a system address space that can be included in embodiments.

FIG. 19 is a table showing a memory address space 1984 of a system according to an embodiment. A memory address space 1984 can include physical addresses (ADDRESS) having various data stored therein, including firmware 1984-0. In some embodiments, some or all accesses to addresses assigned to firmware (e.g., 0x4000000 to 0x4005000) can be accessed with selectable transaction data sizes 1985, as described herein or equivalents.

In this way, a system may assign memory device access transactions of selectable data size to one or more regions of system memory space.

Figure 20:
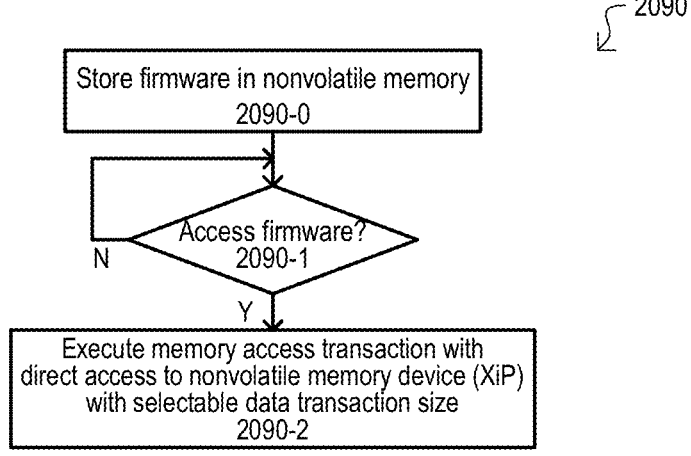
FIG. 20 is a flow diagram of a system operation according to an embodiment.

FIG. 20 is a flow diagram of a method 2090 according to another embodiment. A method 2090 can be executed by a host device. A method 2090 can include storing firmware in a nonvolatile memory 2090-0. In some embodiments, such an action can include but is not limited to, transmitting a program CMD/ADD sequence with a selected program data size, as described herein or equivalents. Subsequently, if firmware access occurs (Y from 2090-1), such memory accesses can be a data transaction that directly access the nonvolatile memory with a selectable data transaction size (e.g., size by LEN) 2090-2. In some embodiments, such an access can be an XiP type accesses, and thus do not include the time or extra components involved in copying firmware to a volatile memory, as in some conventional approaches.

In this way, in response to firmware accesses, a host device can execute data transactions with selectable data transaction sizes.

Figure 21:
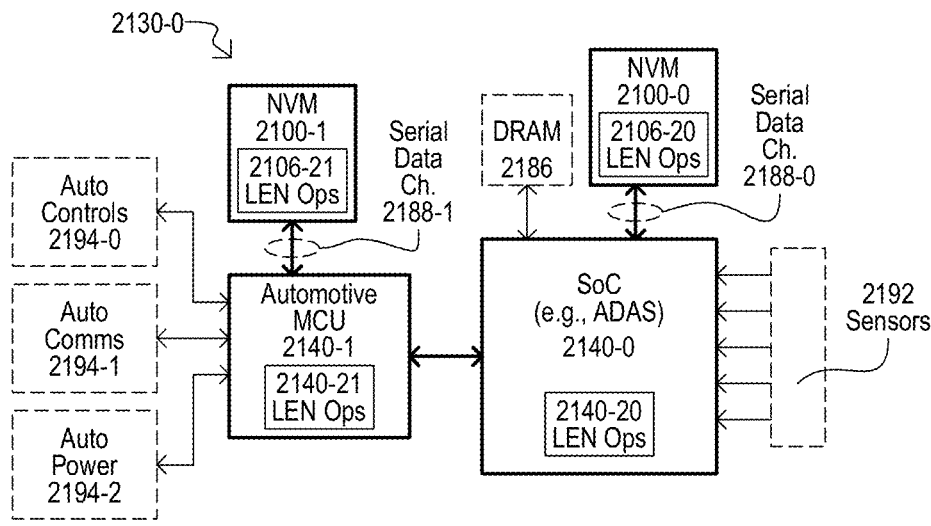
FIG. 21 is a block diagram of a vehicle system according to an embodiment.

Embodiments can include any suitable system that can benefit from rapid, secure, flexible access to a memory, such as nonvolatile memory. Embodiments can be advantageously employed in systems that access code from high reliability, secure memory devices, such as automobile systems. FIG. 21 shows an automobile system 2130 according to an embodiment. System 2130 can include a first NVM device 2100-0, second NVM device 2100-1, a SoC 2140-0, automotive microcontroller (MCU) 2140-1, sensors 2192, auto controls 2194-0, auto communications systems 2194-1, auto power systems 2194-2, and optionally, a dynamic random access memory (DRAM) device 2186. NVM devices 2100-0/1 can be capable of executing transactions of variable data size (LEN Ops) 2106-20/21. SoC 2140-0 and MCU 2140-1 can be capable of generating CMD/ADD sequences with LEN values (LEN Ops) 2140-0/1.

SoC 2140-0 and first NVM device 2100-0 can be a host device and corresponding NVM device according to any of the embodiments shown herein. Accordingly, SoC 2304-0 can use data transactions with variable data length sizes to securely execute code in place stored in NVM device 2188-0, eliminating the need to copy such code to a "shadow" volatile memory for authentication prior to execution. Transactions can include read operations with extended data for authenticating code, where an LEN value can be used to demarcate where read data ends and corresponding authentication data begins. Similarly, MCU 2140-1 and second NVM device 2100-1 can be a host device and corresponding NVM device according to any of the embodiments shown herein, or equivalents. Thus, MCU 2140-1 can include XiP operations using data transactions with LEN values 2188-1 for accessing code and any other suitable operations.

While a DRAM device 2188 can be included, such a device can serve purposes other than shadowing code, as SoC/MCU 2140-0/1 can execute code in place from NVM devices 2100-0/1.

In this way, an automobile control system can include one or more nonvolatile memory devices that execute data transactions of variable data transaction size with controller devices.

Figure 22:
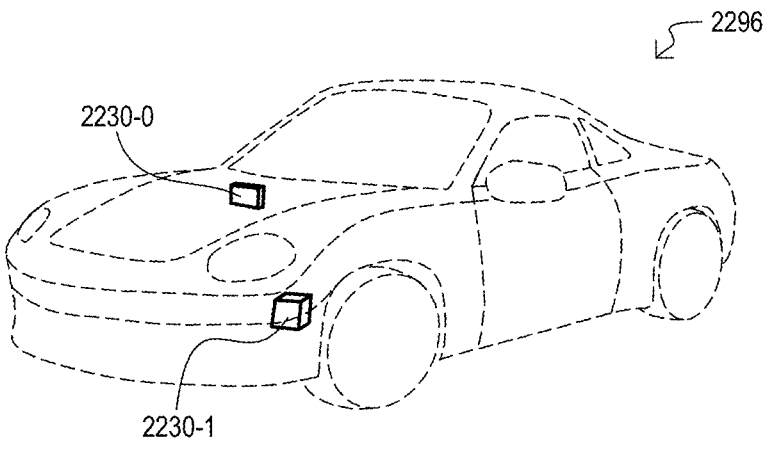
FIG. 22 is a diagram of a vehicle system according to an embodiment.

Referring to FIG. 22 an automobile system 2296 according to an embodiment is shown in a diagram. An automobile system 2296 can have numerous sub-systems (two shown as 2300-0 and 2300-1) that operate with firmware accessed from an NVM device. Such sub-systems (2230-0, 2230-1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (2230-0, 2230-1) can include at least one host device and one or more NVM devices that can execute extended data transactions, as described herein or equivalents. Such transactions can include, but are not limited to, selectable data transaction size, authentication, error correction or error detection.

In this way, an automobile can benefit from variable data size transactions with NVM devices.

Embodiments can include methods, devices and systems that include receiving, at a serial IO of a memory device, at least command values, address values and an encoded length value in synchronism with a serial clock; determining from at least the command, address and encoded length values, a memory access operation, a memory array location, and one of a plurality of different LEN values corresponding to the memory access operation. At least data of the one length LEN can be transmitted at the serial IO in synchronism with the serial clock during execution of the memory access operation.

Embodiments can include methods, devices and systems having a memory cell array and decoder circuits configured to determine a memory access operation from command values, a memory cell array location from address values, and one of a plurality of different data length values (LEN) from an encoded data length value. Control circuits can be configured to access the memory cell array location according to the memory access operation. IO circuits can include a serial clock input configured to receive a serial clock, and at least one serial IO configured to receive command values, address values, and encoded extended data length values in synchronism with the serial clock, and transfer at least data of the length LEN.

Embodiments can include methods, devices and systems having a memory device that includes a memory cell array and control circuits configured to determine a memory access operation and location from command and address values, determine one of a plurality of data length values (LEN) from encoded data length values, and access the memory cell array location according to the memory access operation. IO circuits can be configured to receive command values, address values, and encoded extended data length values at a serial IO in synchronism with the serial clock, and transfer at least data of the length LEN. A serial bus can be coupled to at least the IO circuits.

Methods, devices and systems according to embodiments can include receiving command bits in synchronism with the serial clock, receiving address bits in synchronism with the serial clock after the command bits, and receiving LEN bits in synchronism with the serial clock after the address bits.

Methods, devices and systems according to embodiments can include receiving a first set of command bits in synchronism with the serial clock, receiving a second set of command bits and LEN bits in synchronism with the serial clock after the first set, and receiving address bits in synchronism with the serial clock after the second set.

Methods, devices and systems according to embodiments can include receiving command bits in synchronism with the serial clock, receiving a first set of address bits in synchronism with the serial clock after the command bits, and receiving a second set of address bits and LEN bits in synchronism with the serial clock after the first set.

Methods, devices and systems according to embodiments can include selectable transaction data sizes that are multiples of X, where X is an integer.

Methods, devices and systems according to embodiments can include determining that a memory access operation is a read operation; and transferring at least the data of the one length LEN includes transferring read data of length LEN stored at the address at the serial IO.

Methods, devices and systems according to embodiments can include determining that a memory access operation is an authenticated read operation; and transferring at least the data of the one length LEN includes transferring read data of length LEN stored at the address followed by authentication data for authenticating the read data from the memory device at the serial IO.

Methods, devices and systems according to embodiments can include determining that the memory access is a program or write operation; and transferring at least the data of the one length LEN includes receiving program or write data of length LEN at the serial IO of the memory device.

Methods, devices and systems according to embodiments can include determining that the memory access is an authenticated program or write operation; and transferring at least the data of the one length LEN comprises receiving program or write data of length LEN followed by authentication data at the serial IO of the memory device, the authentication data for authenticated at least the write or program data.

Methods, devices and systems according to embodiments can include, by operation of a host device, determining LEN for memory access operations, and in response to a request to access a memory space corresponding to the memory device, transmitting at least the command, address and LEN values to the serial IO in synchronism with the serial clock.

Methods, devices and systems according to embodiments can include a memory cell array that includes nonvolatile memory cells.

Methods, devices and systems according to embodiments can include a serial clock input and at least one serial IO compatible with at least one Serial Peripheral Interface (SPI) standard.

Methods, devices and systems according to embodiments can include IO circuits are configured to receive command data bits in synchronism with the serial clock, receive address data bits in synchronism with the serial clock after the command bits, and receive encoded LEN bits in synchronism with the serial clock after the address bits.

Methods, devices and systems according to embodiments can include IO circuits are configured to receive a first set of command data bits in synchronism with the serial clock, receive a second set of command data bits and encoded LEN bits in synchronism with the serial clock after the first set, and receive address data bits in synchronism with the serial clock after the second set.

Methods, devices and systems according to embodiments can include IO circuits are configured to receive command data bits in synchronism with the serial clock, receive a first set of address data bits in synchronism with the serial clock after the command bits, and receive a second set of address bits and encoded LEN bits in synchronism with the serial clock after the first set.

Methods, devices and systems according to embodiments can include IO circuits are configured to receive command values, address values, and encoded extended length values in a format selected from the group of: receiving command bits, followed by address bits followed by encoded extended length bits, and receiving command bits, followed by encoded extended length bits, followed by address bits.

Methods, devices and systems according to embodiments can include a host device having command address generator circuits configured to generate a first command value, first address value and encoded extended length value in an authenticated read operation, authentication circuits configured to authenticate at least read data with corresponding extended data, and host IO circuits. Host IO circuits can be coupled to the serial bus and configured to transmit the first command value, first address value, and first encoded extended data length value at a host serial IO in synchronism with the serial clock, and receive read data and corresponding extended data of length LEN.

Methods, devices and systems according to embodiments can include a memory device having a memory cell array comprising nonvolatile memory cells configured to store code; and a host device that includes processor circuits configured to execute the code directly from the memory device with authenticated read operations.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method, comprising:
   receiving, at a serial input/output (IO) of a memory device, at least command values, address values and metadata that includes an encoded length value in synchronism with a serial clock;
   determining from at least the command values, the address values, and the encoded length values
   a memory access operation,
   a memory array location, and
   one of a plurality of different data length values (LEN) corresponding to the memory access operation; and
   transferring at least data having a length corresponding to the one of the plurality of different LEN at the serial IO in synchronism with the serial clock during execution of the memory access operation.

2. The method of claim 1, wherein:
   receiving the at least command values, address values and metadata includes
   receiving command bits in synchronism with the serial clock, receiving address bits in synchronism with the serial clock
after the command bits, and receiving LEN bits in synchronism with the serial clock
after the address bits.

3. The method of claim 1, wherein:

receiving the at least command values, address values and
metadata includes receiving a first set of command bits in synchronism with
the serial clock, receiving a second set of command bits and LEN bits in
synchronism with the serial clock after the first set, and receiving address bits in synchronism with the serial clock
after the second set.

4. The method of claim 1, wherein:

receiving the at least command values, address values and
metadata includes receiving command bits in synchronism with the serial
clock, receiving a first set of address bits in synchronism with the
serial clock after the command bits, and receiving a second set of address bits and LEN bits in
synchronism with the serial clock after the first set.

5. The method of claim 1, wherein the plurality of
different data length values are multiples of X, wherein X is
an integer.

6. The method of claim 1, wherein:

determining that the memory access operation is a read
operation; and transferring at least the data having the length correspond-
ing to the one of the plurality of LEN comprises
transferring read data of length LEN that is stored at an
address corresponding to address values from the
memory device at the serial IO.

7. The method of claim 1, wherein:

determining that the memory access operation is an
authenticated read operation; and transferring at least the data having the length correspond-
ing to the one of the plurality of LEN comprises
transferring read data of length LEN stored at an
address corresponding to the address values followed
by authentication data for authenticating the read data
from the memory device at the serial IO.

8. The method of claim 1, wherein:

determining that the memory access operation is a pro-
gram or write operation; and transferring at least the data having the length correspond-
ing to the one of the plurality of LEN comprises
receiving program or write data of length LEN at the
serial IO of the memory device.

9. The method of claim 1, wherein:

determining that the memory access operation is an
authenticated program or write operation; and transferring at least the data having the length correspond-
ing to the one of the plurality of LEN comprises
receiving program or write data of length LEN fol-
lowed by authentication data at the serial IO of the
memory device, the authentication data for authenti-
cating at least the write or program data.

10. The method of claim 1, further including:

by operation of a host device determining LEN for memory access operations, and in response to a request to access a memory space
corresponding to the memory device, transmitting at
least the command values, address values and metadata
that includes the encoded length value to the serial IO
in synchronism with the serial clock.

11. A device, comprising:

a memory cell array;

decoder circuits configured to determine, a memory access operation from command values, a memory cell array location from address values, and one of a plurality of different data length values (LEN)
from an encoded data length value included in meta-
data;

control circuits configured to access the memory cell
array location according to the memory access opera-
tion; and input/output (IO) circuits that include a serial clock input configured to receive a serial clock,
and at least one serial IO configured to receive command values, address values, and the meta-
data in synchronism with the serial clock, and transfer at least data of the length LEN.

12. The device of claim 11, wherein the memory cell array
comprises nonvolatile memory cells.

13. The device of claim 11, wherein the serial clock input
and at least one serial IO are compatible with at least one
Serial Peripheral Interface (SPI) standard.

14. The device of claim 11, wherein:

the IO circuits are configured to receive command data bits in synchronism with the serial
clock, receive address data bits in synchronism with the serial
clock after the command bits, and receive encoded LEN bits in synchronism with the serial
clock after the address bits.

15. The device of claim 11, wherein:

the IO circuits are configured to receive a first set of command data bits in synchronism
with the serial clock, receive a second set of command data bits and encoded
LEN bits in synchronism with the serial clock after the
first set, and receive address data bits in synchronism with the serial
clock after the second set.

16. The device of claim 11, wherein:

the IO circuits are configured to receive command data bits in synchronism with the serial
clock, receive a first set of address data bits in synchronism with
the serial clock after the command bits, and receive a second set of address bits and encoded LEN bits
in synchronism with the serial clock after the first set.

17. A system, comprising:

a memory device that includes a memory cell array, control circuits configured to determine a memory access operation and location
from command and address values, determine one of a plurality of data length values
(LEN) from encoded data length values included
in metadata, access the memory cell array location according to
the memory access operation, and input/output (IO) circuits configured to receive the command values, the address values, and
the metadata at a serial IO in synchronism with the
serial clock, and transfer at least data of the length LEN; and a serial bus coupled to at least the IO circuits.

18. The system of claim 17, wherein:

the IO circuits are configured to receive command values, address values, and encoded extended length values in a format selected from the group of:

receiving command bits, followed by address bits followed by encoded extended length bits, and receiving command bits, followed by encoded length bits, followed by address bits.

19. The system of claim 17, further including:

a host device that includes command address generator circuits configured to generate a first command value, a first address value and metadata that includes an encoded length value in an authenticated read operation, authentication circuits configured to authenticate at least read data with corresponding authentication data, host IO circuits coupled to the serial bus and configured to transmit the first command value, first address value, and the metadata at a host serial IO in synchronism with the serial clock, and receive read data of the length LEN and corresponding authentication data.

20. The system of claim 19, further including:

the memory device includes a memory cell array comprising nonvolatile memory cells configured to store code; and the host device that includes processor circuits configured to execute the code directly from the memory device with authenticated read operations.

\* \* \* \* \*